March 5, 1963  R. H. HOBERT  3,080,442
APPARATUS AND PROCESS FOR THE CONVERSION OF HEAT TO ELECTRICITY
Filed Dec. 30, 1957
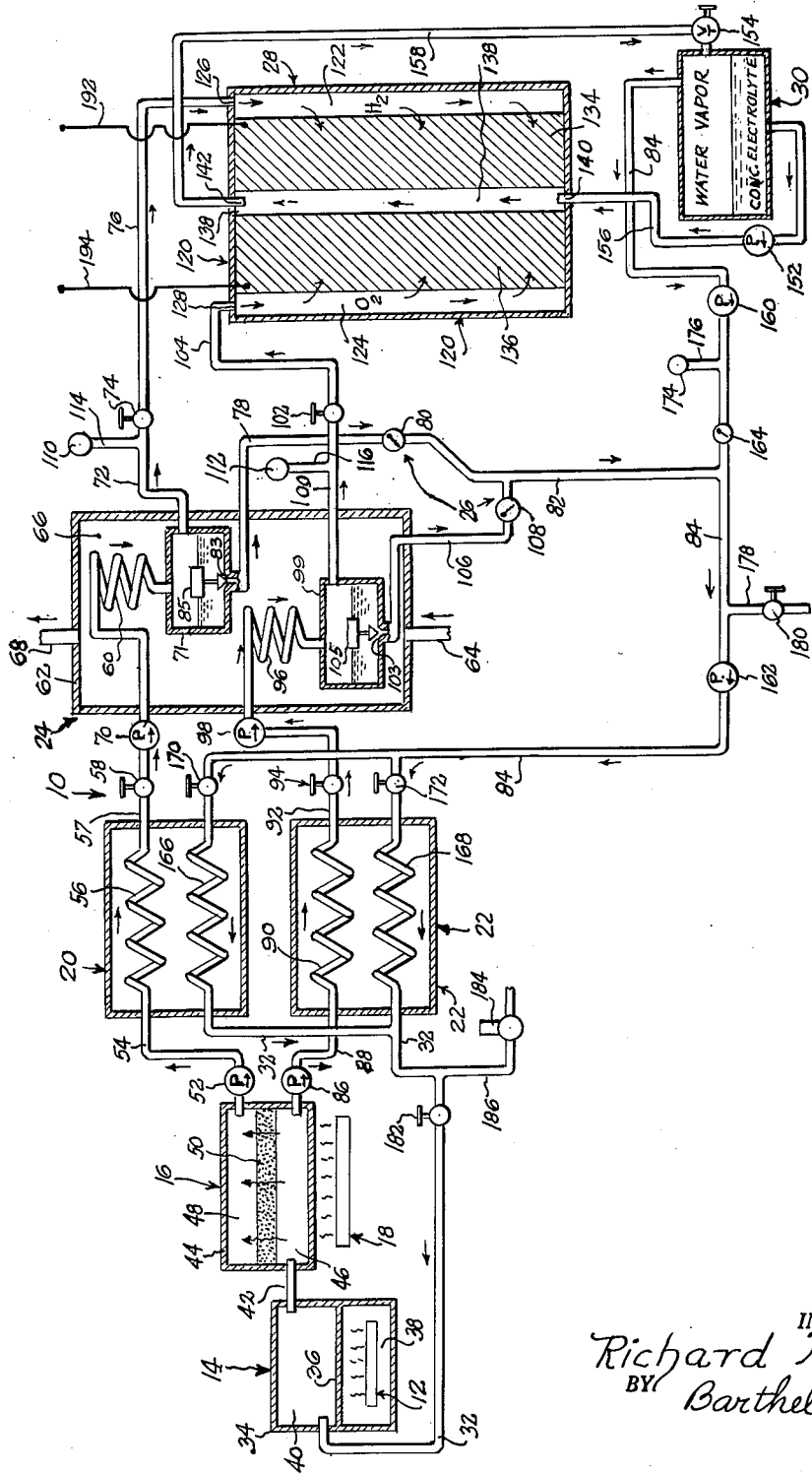
INVENTOR
Richard H. Hobert
BY Barthel & Bugbee
Attys

United States Patent Office 3,080,442
Patented Mar. 5, 1963

3,080,442
APPARATUS AND PROCESS FOR THE CONVERSION OF HEAT TO ELECTRICITY
Richard H. Hobert, Wamphaussic Point, R.F.D. 1, Stonington, Conn.
Filed Dec. 30, 1957, Ser. No. 706,165
6 Claims. (Cl. 136—86)

This invention relates to apparatus and processes of converting thermal energy to electrical energy.

One object of this invention is to provide apparatus and a process for converting thermal energy to chemical energy and thence directly into electrical energy without requiring the use of steam turbines, driving mechanical electrical generators, as has heretofore been customary.

Another object is to provide apparatus and a process for converting thermal energy to electrical energy wherein heat from a suitable external source is employed to dissociate a chemical compound, such as water, into its component gases, which gases are then separated from one another and recombined in a so-called fuel cell containing electrodes which give off electricity generated as the result of the recombination of the gases.

Another object is to provide an apparatus and process for converting thermal energy to electrical energy wherein the chemical compound produced by re-combination of the component gases in the fuel cell is returned to the dissociation device for repeated dissociation, thereby re-utilizing the chemical compound as a working fluid in a cyclical process and cyclically-operating apparatus.

Another object is to provide an apparatus and process of converting thermal energy to electrical energy wherein heat remaining in the component gases of the working fluid or chemical compound after dissociation and separation is transmitted from the gases before entry into the fuel cell to the recombined working fluid or chemical compound returning from the cell on its way back to the dissociation device.

Another object is to provide an apparatus and process of converting thermal energy to electrical energy which possess a high operating efficiency of energy conversion which can approach that of a Carnot cycle heat engine operating between the same temperature limits.

The drawing illustrates diagrammatically one form of apparatus according to the invention, in which the process of converting thermal energy to electrical energy can be carried out, according to the invention.

The drawing in general shows diagrammatically a thermal-to-electrical energy-conversion apparatus, generally designated 10, by which a working fluid, such as water, converted into steam by the application of heat, is partially dissociated by heat from an external source 12 in a thermal water dissociator 14 into its component gases hydrogen and oxygen, the mixture of which is partially separated into hydrogen gas and a mixture of oxygen and water vapor in a gas separator 16 which may be assisted by an auxiliary external source of heat 18. The hydrogen-enriched and oxygen-enriched gases, separated from one another in the separator 16 are pumped through hydrogen and oxygen heat exchangers 20 and 22 respectively to impart their heat to returning working fluid, after which the gases are passed through a gas cooler 24, the water being returned to the returning working fluid through a water disposal unit 26, after which the hydrogen and oxygen gases are separately fed into an electro-chemical fuel cell 28 where they are recombined into water, with electricity given off as a result of this reaction. The water evolved in the fuel cell 28 weakens the electrolyte therein, hence the excess water is separated from the electrolyte in an electrolyte water remover 30 from which the electrolyte is returned to the fuel cell 28 and the water through the heat exchangers 20 and 22 back to the thermal dissociator 14, as described in more detail below.

Referring to the drawing in detail, the dissociator 14 receives water initially, and superheated steam subsequently through a steam supply or return pipe 32 and, in response to intense heat supplied by the external heat source 12, converts a part of this water or steam into hydrogen and oxygen gases, mixed with steam. The percentage of water dissociated in the dissociator 14 depends upon the temperature and pressure at which dissociation takes place. The following table, for example, indicates the percentage of water dissociated at varying absolute temperatures in degrees Kelvin at various pressures in atmospheres, as calculated from theory and given in Table 8 on page 32 of Chapter 1B of the book "Properties of Ordinary Water-Substance," by Dorsey, published by the Reinhold Publishing Co., of New York, N.Y., as No. 81 of the American Chemical Society Monograph Series.

| Temperature (degrees K.) | Pressure (atmospheres) | | |
|---|---|---|---|
| | 0.1 | 1.0 | 10.0 |
| 1,500 | 0.0434 | 0.0202 | 0.00936 |
| 2,000 | 1.25 | 0.579 | 0.269 |
| 2,500 | 8.77 | 4.17 | 1.96 |
| 3,000 | 27.7 | 14.1 | 6.85 |

The same textbook also gives the following observed values of dissociation for different temperatures at atmospheric pressure.

| Temperature (degrees K.): | Percentage dissociation |
|---|---|
| 1783 | 0.182 |
| 1863 | 0.354 |
| 1968 | 0.518 |
| 2155 | 1.18 |
| 2257 | 1.77 |
| 2337 | 2.8 |
| 2505 | 4.5 |

Since the dissociation of the water into hydrogen and oxygen takes place simply by elevating the temperature while maintaining a low pressure, different forms of dissociators may be used according to the space and weight requirements and efficiency and cost elements involved. The dissociator 14 is therefore shown in a diagrammatic form for ease of understanding, as consisting of a casing 34 containing a partition 36 separating it into a heater chamber 38 containing the heater 12 and a dissociation chamber 40 in which dissociation takes place.

From the dissociator 14, the pipe 42 carries the mixture of hydrogen gas, oxygen gas and water in the form of steam or water vapor into the gas separator 16. This also in the drawing is shown as a single housing 44 containing lower and upper chambers 46 and 48 separated from one another by a so-called gas diffusion membrane 50 consisting of a wall of material having very fine pores which allow passage of the molecules of the gases, but which act much as small individual orifices so that the passage of the molecules through the membrane is restricted, and a pressure difference can be maintained between the chambers 46 and 48 by means of pumps or compressors 52 and 86. The material of the diffusion membrane or barrier 50 is not critical and various types of porous high temperature ceramic membranes or barriers are known to those skilled in this art and are available on the market. Their details are conventional and are beyond the scope of the present invention. Since the velocity of effusion of molecules through small orifices or diffusion membranes is inversely proportional to the square root of the molecular weight of the gases, at least on a statistical basis when the bases are at a constant temperature and pressure, the hydrogen molecules will pass through the membrane with a greater velocity than the oxygen and water molecules. Due, however, to the great abundance of water molecules in the gas, since only a small percentage of the water is dissociated, water molecules will also pass through the membrane in considerable numbers. Hence, the gas extracted through the pipe 54 will consist of hydrogen and water molecules and a small amount of oxygen. The auxiliary source of heat supply 18 may receive heat from the same main source of heat supply 12, and effects additional dissociation while gas separation by diffusion is taking place.

While the drawing, for purposes of simplification, shows only a single-stage gas separator 16, it will be understood that in practice, multiple stages may be used. Furthermore, to decrease the partial pressure of the hydrogen in the upper chamber 48 without requiring a large pressure drop across the diffusion membrane 50, an inert gas may be introduced into the upper chamber 48. This inert gas, of any suitable character, must either be removed from the working fluid before entering the cell 28 or it must be vented from the cell. In either case, this gas can then be recirculated to the chamber 48 through appropriate pressure-reducing valves. This gas does not need to be inert, but it must be possible to separate the hydrogen gas therefrom without requiring large amounts of energy or equipment. The use of such gas is optional, and the separation process can be maintained without it, hence the equipment for handling such a gas has not been indicated in the accompanying drawing. Such separation of gases by means of diffusion is known to physical chemists and is described, for example, in the book "Textbook on Physical Chemistry," by Samuel Glasstone, Van Nostrand, New York, Second Edition, 1946, page 153 of which describes membrane diffusion including the separation of isotopes by diffusion methods and page 154 of which describes thermal diffusion methods; also the book "Sourcebook on Atomic Energy," by the same author and publisher (1950), pages 200 to 204, "The Gaseous Diffusion Methods"; also the book "Atomic Energy for Military Purposes," by H. B. Smyth, Princeton University Press, 1945, pages 158-159 and 175-186 in Chaper X, "The Separation of the Uranium Isotopes by Gaseous Diffusion."

The hydrogen gas from the hydrogen chamber 48 of the gas separator 44 is pumped by a suitable pump 52 through a pipe 54 and heat exchange coil 56 within the hydrogen heat exchanger 20 by way of a pipe 57 containing a valve 58 to a cooling coil 60 within the gas cooler 24. A coolant enters the coolant chamber 66 which is enclosed within the casing 62 by means of a coolant supply pipe 64. A discharge pipe 68 conducts the now-warm coolant out of the chamber 66. The purpose of the gas cooler is three-fold. It furnishes a mechanism for rejecting waste heat to the atmosphere or other convenient heat sink, it cools the component gases to facilitate the removal of a large portion of the entrained water vapor, and it reduces the temperature of the component gases to temperatures compatible with the requirements of the fuel cell, and to maintain the appropriate temperature differences required in the operating system. The nature of the coolant will, in general, depend on the application. For example, atmospheric air could be used directly for certain applications, whereas water or low temperature steam might prove attractive in others. The techniques of heat rejection are well known to mechanical engineers and are beyond the scope of the present invention. The need for a gas cooler is evident from the second law of thermodynamics. The thermal efficiency of the over-all energy conversion process cannot exceed that of an ideal Carnot cycle engine operating between the same temperature limits, and this efficiency E can be expressed as:

$$E = \frac{T_2 - T_1}{T_2}$$

where $T_2$ is the absolute temperature at which thermal energy is supplied
$T_1$ is the absolute temperature at which thermal energy is rejected
E is the ideal thermal efficiency.

From this it is evident that a certain fraction of the energy which is supplied must be rejected as waste heat, and that this fraction is $1-E$ in the ideal case. But since $$1 - E = \frac{T_1}{T_2}$$

this is an equivalent expression for the fraction of the thermal energy which must be rejected. Due to other efficiency losses in the system, the thermal energy rejected will be a larger fraction of the thermal energy supplied. The gas cooler 24 rejects excess energy and prevents overheating of the system like the cooling systems on conventional heat engines. From thermodynamic considerations, the temperature of energy rejection should be as low as possible in order to achieve the maximum efficiency, hence the cell 28 should therefore operate at or near the temperature of energy rejection, whereas from electrochemical considerations it must operate at a moderate temperature in order to increase the rate of reaction so that the size, weight and cost of the cell 28 can be kept within reasonable limits. Since the gas cooler 24 does not need to operate at a temperature much lower than the temperature of operation of the cell 28, other than the temperature differences required for condensation in the cooler 24, and as a means of controlling the temperature within the cell 28, the temperature at which heat is rejected is relatively high if the Bacon cell is used as the cell 28. The hydrogen to be cooled is pumped through the coil 60 by a pump 70, which cooling reduces its temperature to a temperature suitable for handling within the electrochemical cell 28 and at the same time removes water vapor by condensing it to liquid water. The hydrogen thus cooled passes through a tank 71, pipe 72, valve 74 and pipe 76 to the fuel cell 28. The water condensed from the hydrogen in the coil 60 is drained off through a port 83 controlled by a float valve 85 and through a pipe 78 and check valve 80 into a pipe 82 leading to a return line 84.

Meanwhile, the mixture of oxygen gas and water vapor left in the lower chamber 46 of the gas separator 44 is pumped by a pump 86 through a pipe 88 into a heat exchange coil 90 within the oxygen heat exchanger 22 whence it is pumped by a pump 98 through a pipe 92 and valve 94 into an oxygen cooling coil 96 also located in the cooling chamber 66 of the gas cooler 24. The oxygen thus cooled passes through a tank 99, pipe 100, valve 102 and pipe 104 to the fuel cell 28. The water condensed from the oxygen in the cooling coil 96 is drained off through a port 103 controlled by a float valve 105 and through a pipe 106 and check valve 108 into the pipe 82 and thence into the return pipe 84. Surge tanks 110 and 112 respectively are connected by pipes 114 and 116 to the pipes 72 and 100 immediately ahead of the valves 74 and 102 respectively.

The electrochemical fuel cell 28 in which the hydrogen and oxygen gases are recombined, accompanied by the emission of electricity, is shown diagrammatically in the drawing as its details are conventional and hence are beyond the scope of the present invention. One suitable fuel cell for this purpose is known as the Bacon fuel cell invented in England by Francis T. Bacon and disclosed and claimed in the Bacon Patent 2,716,670 of August 30, 1955, for Alkaline Primary Cells, and also described by A. Adams in the journal "Chemical and Process Engineering," 35:1 (1954). The Bacon fuel cell 28 consists generally of a closed and gas-tight housing 120 having on opposite sides thereof vertical hydrogen and oxygen gas passageways 122 and 124 respectively extending from top to bottom and having inlet ports 126 and 128 at the top. Arranged within the housing 120 are two laterally-spaced porous nickel electrode structures 134 and 136 respectively spaced apart from and insulated from one another and from the housing 120, the spacing therebetween providing a vertical central electrolyte passageway 138 having an outlet port 142 at the top and an inlet port 140 at the bottom.

The hydrogen supply pipe 76 is connected to the hydrogen inlet port 126 of the electrochemical cell 28. Similarly, the oxygen supply pipe 104 is connected to the oxygen inlet port 128. Concentrated electrolyte is supplied to the cell through the electrolyte supply pipe 156 which is attached to the inlet port 140. The electrolyte is pumped through the electrolyte supply pipe 156 from the electrolyte water remover 30 by a pump 152, whereas an electrolyte return pipe 158 runs from the electrolyte outlet port 142 back to the electrolyte water remover 30 while the pressure is reduced by a throttling valve 154 to facilitate the evaporation of excess water in the electrolyte water remover. From the latter, the return pipe 84 containing the pumps 160 and 162 and the check valve 164 runs back to heat exchange coils 166 and 168 within the hydrogen heat exchanger 20 and oxygen heat exchanger 22 respectively, these being provided with valves 170 and 172 between them and the return pipe 84. A surge tank 174 is connected by a pipe 176 to the return pipe 84 between the pump 160 and check valve 164 and a drain pipe 178 is likewise connected to the return pipe 84 and provided with a drain valve 180 for draining the pipe 84. From the opposite ends of the heat exchange coils 166 and 168 the steam return or supply pipe 32 runs back to the dissociation chamber 40 of the thermal water dissociator 14 by way of a valve 182, completing the circuit. A pressure relief valve 184 is connected by a pipe 186 to the steam return or supply pipe 32.

Multiple cell arrays or batteries of the cells 28 may be provided to furnish higher voltages by electrically connecting the cell 28 in series, and to furnish larger currents by electrically connecting the cells 28 in parallel. In any case, the fuel gases can be supplied to the cells by pipe lines in a "parallel" arrangement, and the electrolyte can be withdrawn and recirculated through a common water remover 30 in most cases. Special provision should be made for the isolation of the electrolyte from groups of cells 28 if a great many of the cells 28 were arranged in series. This arrangement of multiple cells would use common inputs from common heat exchangers.

In the operation of the apparatus 10 and in the carrying out of the process of the invention, and assuming, for example (but not by way of limitation), that the fuel cell 28 is of the so-called Bacon type, a 27% potassium hydroxide aqueous solution is supplied to the electrolyte passageway 138 of the fuel cell 28 and circulated by the pump 152 and aided in its flow by thermosyphon action upward through the passageway 138. At the same time, a coolant such as water which is used for the removal of waste heat, is supplied from an external source (not shown) through the pipe 64 to the gas cooler 24. Water or steam is initially supplied through the steam supply pipe 32 to the dissociation chamber of the water dissociator 14 while heat from the heater 12 acts upon the steam in the chamber 40 to convert it to a mixture of hydrogen ($H_2$), oxygen ($O_2$) and steam or water vapor ($H_2O$). In accordance with the table given above, the temperature within the dissociator chamber 40 is maintained as high as possible and the pressure as low as practical, preferably below 10 atmospheres, in order to obtain the maximum percentage of dissociation. This mixture flows through the pipe 42 into the lower chamber 46 of the gas separator 16 where further dissociation is assisted by heat from the auxiliary heater 18, the flow being enhanced by the action of the pumps 52 and 86.

The high velocity hydrogen molecules pass rapidly through the pores of the diffusion membrane 50, whereas the oxygen and water molecules, by virtue of their higher molecular weights, are traveling at much slower velocities, and hence a smaller fraction of the total number of oxygen and water molecules pass through the membrane in any given time period. The action of the membrane 50 provides a means for separating, to some extent, the molecules in a mixed gas, on the basis of their molecular weights. Since the hydrogen molecules which pass through the membrane 50 and enter the chamber 48 deplete the amount of hydrogen in the mixed gas in the chamber 46, there is a change in the partial pressures of the mixed gases in the chamber 46. This favors the further dissociation of the water molecules contained in these mixed gases provided that sufficient thermal energy is added, as for example, by the auxiliary heater 18. Thus, the fraction of water admitted to the dissociation chamber and separator, which is dissociated, may be larger than the value given in the dissociation products listed in the table above provided that the products of dissociation are withdrawn, and that the pressures in chambers 46 and 48 are maintained at their proper values by means of the pumps 86 and 52 respectively, by means of the adjusting valve 182, and by furnishing sufficient thermal energy by heaters 12 and 18. It will also be apparent to physical chemists that the degree of purity can be improved by using multiple stages of diffusion separators (not shown) and that other means may be used to achieve or accelerate the separation of mixed gases. The membrane diffusion separator 50 used in the illustration indicates one method which has been found attractive when one of the mixed gases is hydrogen. Other means of separation include but are not limited to: changes of state, differential solubility in other fluids, and intermediate chemical reactions with subsequent decomposition facilitating the above methods.

The oxygen molecules and water vapor are pumped by the pump 86 through the pipe 88 and heat exchanger coil 90, where the hot mixture gives up heat to the returning steam passing through the coil 168 in the opposite direction. The oxygen, thus reduced, in temperature, is pumped by the pump 98 through the pipe 92 and now-open valve 94 through the cooling coil 96 where its water vapor is condensed into water and passes through the tank 99, port 103, when open, pipes 106 and 82 and check valve 108 into the return line 84. The oxygen, thus freed from water, passes through pipes 100 and 104 and the now-open valve 102 through the oxygen inlet port 128 and oxygen passageway 124 of the fuel cell 28, where it passes through the pores of the porous electrode 136 to the electrolyte in the electrolyte passageway 138.

Meanwhile, the hydrogen gas which has passed through the diffusion membrane 50 of the gas separator 16 into the upper chamber 48 thereof has been pumped by the pump 52 through the pipe 54 into the heat exchange coil 56 of the hydrogen heat exchanger 20, where it gives up heat to the returning water or water vapor passing in the opposite direction through the heat exchange coil 166 to the steam return and supply pipe 32. The hydrogen gas, thus reduced in temperature, is pumped by the pump 70 through the pipe 57 and now-open valve 58 through the cooling coil 60 whence the water condensed therefrom passes through the tank 71 and port 83, when open, into the pipe 78. The hydrogen, thus freed from water, passes through the pipes 72 and 76, the now-open valve 74 and the hydrogen inlet port 126 into the hydrogen passageway 122 where it passes through the pores of the nickel diffusion electrode 134 to the potassium hydroxide electrolyte passing upward through the electrolyte passageway 138. Meanwhile, any traces of water vapor which may have accompanied the hydrogen gas through the diffusion membrane 50 of the gas separator 16 are condensed to liquid water, which flows downward through the pipes 78 and 82 and the check valve 80 to the water return pipe 84.

The hydrogen and oxygen are introduced into the electrochemical fuel cell 28 in the molecular proportions 2:1 and eventually combine within the cell in a manner known to electrochemists and described in Bacon United States Patent No. 2,716,670 of August 30, 1955, to form water, hence the details thereof are conventional and accordingly beyond the scope of the present invention. The water thus formed dilutes the electrolyte in the cell, and the diluted electrolyte is removed through the electrolyte outlet port 142 through the pipe 158 and valve 154 into the water remover 30 where the excess water is removed through the pipe 84 and the electrolyte, once again at its initial concentration, re-enters the cell 28 through the pipe 156 and pump 152 by means of the electrolyte inlet port 140. The reactions within the cell are accompanied by the evolution of electrical energy and some heat. The electrical energy is the useful end product of the cycle, and is conveyed to its ultimate use by means of the electrical conductors 192 and 194. Despite the fact that heat is evolved in the battery, its temperature is maintained at favorable operating conditions by means of controlling the temperatures of the fuel gases which are introduced, and by means of heat removal from the electrolyte in the water remover. A cell heater (not shown) may also be used to heat the fuel cell 28 so as to maintain the proper cell temperature under transient conditions when heat may be required, as for example, when starting the system.

As a result of this action, by withdrawal of electrons from the oxygen electrode 136 and deposition of electrons on the hydrogen electrode 134, a flow of electric current takes place through the conductors 192 and 194 and the external circuit from the hydrogen electrode 134 back to the oxygen electrode 136. The fuel cell 28 during this operation is preferably operated at pressures of 40 to 55 atmospheres (approximately 600 to 800 pounds per square inch) at temperatures preferably lying between 392° F. and 464° F. (200° C. and 240° C.), the cell giving an open circuit voltage output of 1.05 volts at the above-named temperature and pressure.

Meanwhile, the water produced within the cell 28 by the above action dilutes the electrolyte flowing through the electrolyte passageway 138 at a relatively slow rate, the electrolyte being kept from excessive dilution by the action of the water remover 30, which extracts water from the electrolyte and returns it through the return pipe 84 containing the pump 160 and check valve 164 and thence through the heat exchange coils 166 and 168 and the steam return pipe 32 to the water dissociator 14, completing the circuit.

It will be evident to those skilled in the fuel cell art that pressure-regulating valves, relief valves, vents and condensate traps may be added to the circuit shown in the drawing for more improved operation and control of the gas pressure at the various locations. After operation has once commenced, it will also be evident that several of the pumps and valves would not be needed, being made use of principally during the starting and warmup period of operation. For bringing the fuel cell 28 up to its proper operating temperature, a cell heater (not shown) may be added and may be supplied with heat from an external source (not shown).

It will be understood that the carrying out of this invention is not limited to the use of the Bacon cell and other suitable fuel cells may be used, and the temperatures and pressures in the system may be adjusted to the most favorable conditions. It will also be understood that the carrying out of this invention is not limited to the use of porous sintered nickel diffusion electrodes as in the fuel cell 28, but that electrodes of other suitable materials may optionally be used, such as, for example, porous carbon. It will be further understood that while water has been given as the working fluid, the carrying out of the invention is not limited to water, but may employ, as a working fluid, other suitable liquid or gaseous working fluids made up of dissociatable components which when recombined in the fuel cell give off electricity. One such working liquid of this character is hydrogen chloride, which operates in the fuel cell by reduction of chlorine at the external positive electrode or cathode, and oxidation of hydrogen at the external negative electrode or anode, using electrodes of platinum or platinized carbon.

What I claim is:

1. A process of converting heat to electricity by a closed continuous thermodynamic-electrochemical cycle, comprising
    applying heat within a temperature range of 1700 to 2500 degrees Kelvin at pressures up to approximately atmospheric pressure to a working fluid composed of components separable by dissociation in order to at least partially dissociate the working fluid into said separable components,
    physically separating the said components from one another by means of diffusion through a porous high-temperature membrane,
    cooling the thus separated components to increase the fraction of the energy available for conversion to electricity in a fuel cell and further cooling the said component to condense the entrained water vapor thereof into water and to maintain the temperature balance of the system and to reject waste heat,
    subsequently conducting the thus-cooled separated components into an electrochemical fuel cell containing an electrolyte,
    recombining the thus conducted components within the fuel cell to produce electricity while dissolving the reaction products of the said components in the electrolyte of the fuel cell,
    conducting away from the fuel cell to an external circuit the electricity liberated during the recombination of said components,
    subsequently withdrawing the thus diluted electrolyte from the fuel cell at a reduced pressure causing the working fluid therein to separate therefrom by evaporation,
    returning the thus concentrated electrolyte to the fuel cell,
    returning the working fluid separated from the diluted electrolyte to the place of dissociation for redissociation by the further application of heat thereto,
    and applying a portion of the heat extracted from the thus dissociated and separate components to the working fluid returning to the place of dissociation whereby to continuously recycle the working fluid in a closed cyclic process which is not dependent upon an indefinite supply of a consumable working fluid.

2. A process of converting heat to electricity electrochemically, according to claim 1, wherein the working fluid is water.

3. A process of converting heat to electricity electrochemically, according to claim 1, wherein the working fluid is hydrogen chloride.

4. A process of converting heat to electricity electrochemically, according to claim 1, wherein the condensed working fluid removed from the separated gaseous components is also returned to the place of dissociation for redissociation.

5. An apparatus for converting heat to electricity in a closed continuous thermodynamic-electrochemical cycle with the aid of a working fluid composed of components separable by dissociation, said apparatus comprising
    a heat-actuated working fluid dissociator, a heater disposed in heat-supplying relationship with said dissociator, a working fluid component separator communicating with said dissociator and containing a porous high-temperature membrane effective to separate the dissociated components from one another by means of diffusion through said membrane, a heat exchanger for each of said components communicating with said component separator adapted to cool the thus-separated components to increase the fraction of the energy available for conversion to electricity in a fuel cell, a component cooler for each of said components communicating with its respective heat exchanger adapted to condense the entrained water vapor in said components into water and also to maintain the temperature balance of the system and to reject waste heat, an electrochemical fuel cell containing an electrolyte, means for conducting the thus-separated components to said fuel cell for recombination therein to produce electricity while dissolving the reaction products of the said components in the electrolyte of the fuel cell, means for withdrawing from the fuel cell the thus-diluted electrolyte, an electrolyte concentrator adapted to separate the recombined working fluid from the thus withdrawn diluted electrolyte, means for returning from said electrolyte concentrator for thus-concentrated electrolyte to the fuel cell, means for returning to said dissociator from the electrolyte concentrator the working fluid separated therein from the diluted electrolyte for dissociation by the further application of heat thereto, said last-mentioned means communicating with said heat exchangers for applying to the returning working fluid a portion of the heat emitted by said heat exchangers from the dissociated and separated components of the working fluid passing therethrough whereby to provide an apparatus for continuously recycling the working fluid in a closed cyclic process which is not dependent upon an indefinite supply of a consumable working fluid, and conductors connected to said fuel cell for transmitting to an external electrical circuit the electricity produced in said fuel cell in response to the recombination of said components.

6. An apparatus, according to claim 5, wherein means is provided for conducting the condensed working fluid from the component cooler to the dissociator for redissociation by the further application of heat thereto.

References Cited in the file of this patent

UNITED STATES PATENTS

| | | |
|---|---|---|
| 1,056,026 | Hoofnagle | Mar. 18, 1913 |
| 2,384,463 | Gunn et al. | Sept. 11, 1945 |
| 2,581,650 | Gorin | Jan. 8, 1952 |
| 2,581,651 | Gorin | Jan. 8, 1952 |
| 2,716,670 | Bacon | Aug. 30, 1955 |

FOREIGN PATENTS

| | | |
|---|---|---|
| 457 | Great Britain | Jan. 13, 1885 |

OTHER REFERENCES

Electrochemical Society, vol. 106, July–December 1959, pages 1068, 1071.